April 10, 1934. E. W. MILLER 1,953,970
DISPLACEMENT GENERATING MACHINE
Filed June 11, 1930 11 Sheets-Sheet 5
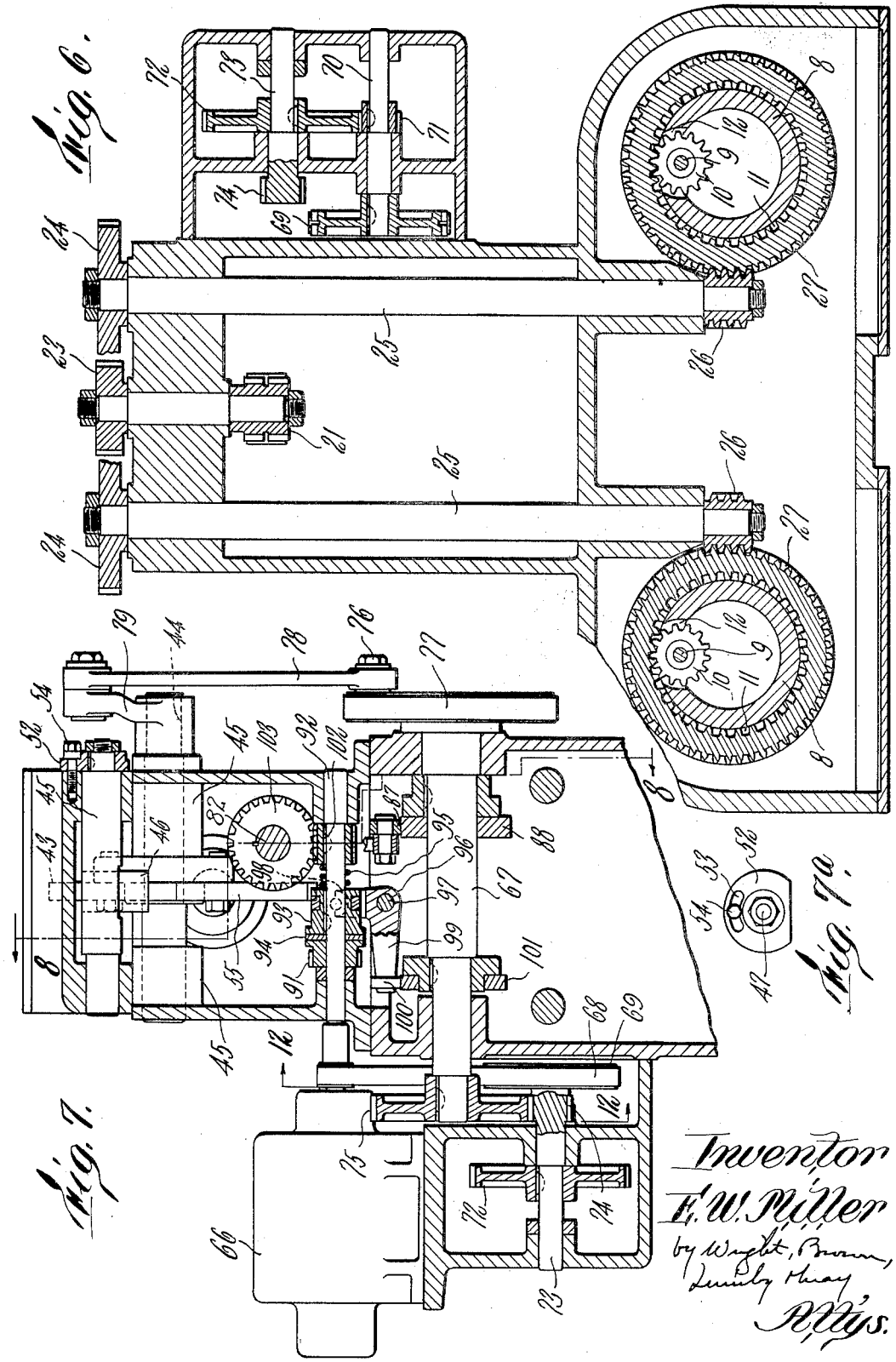

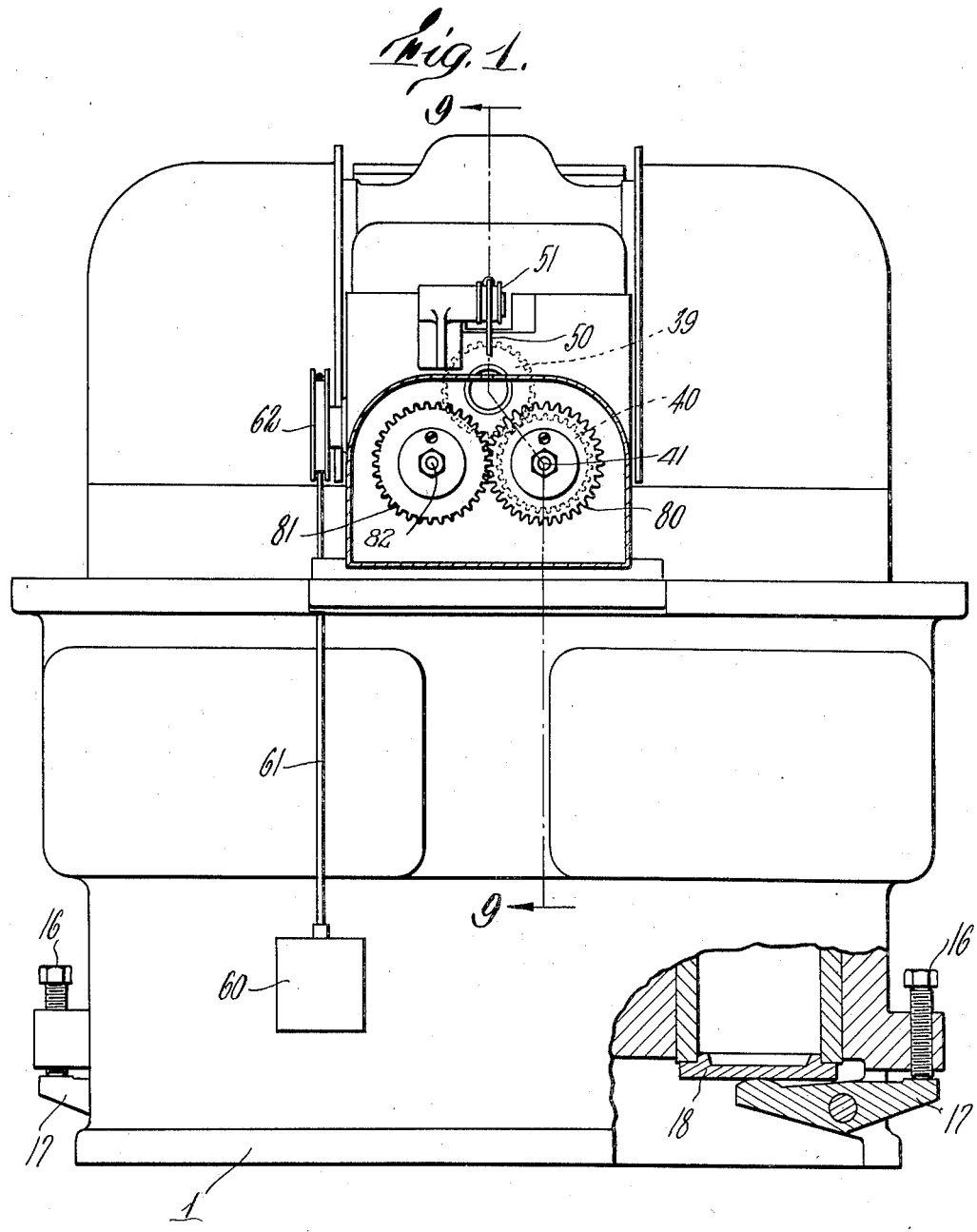

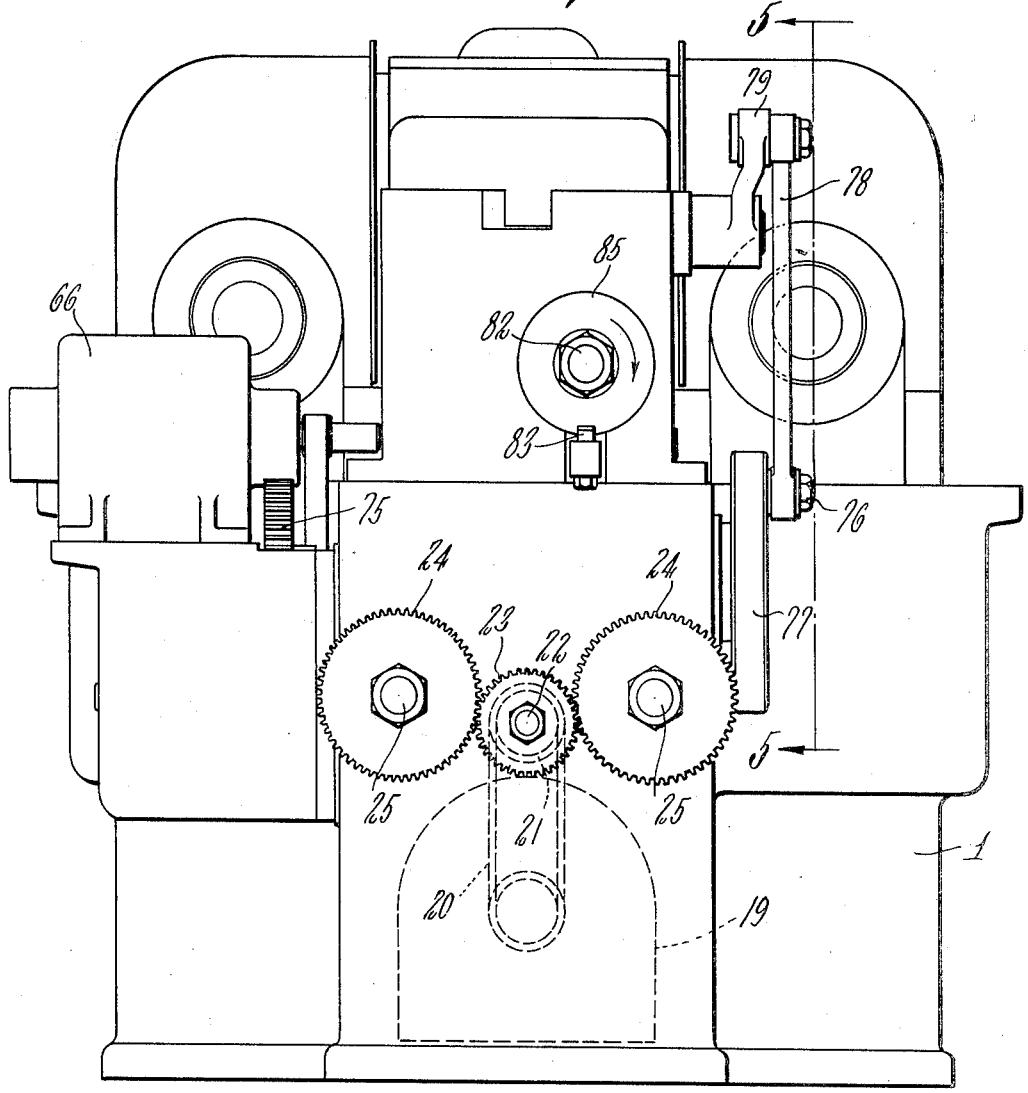

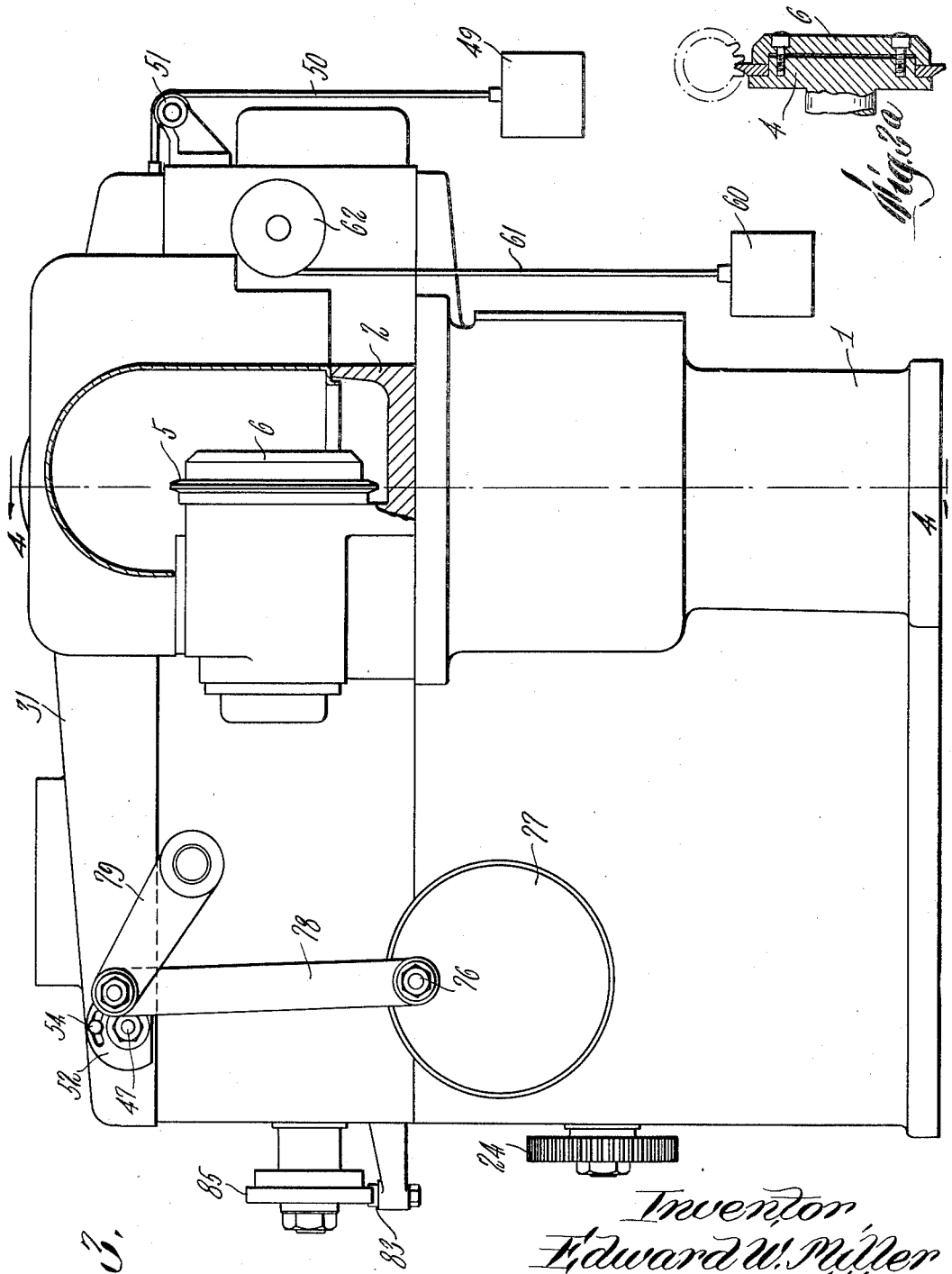

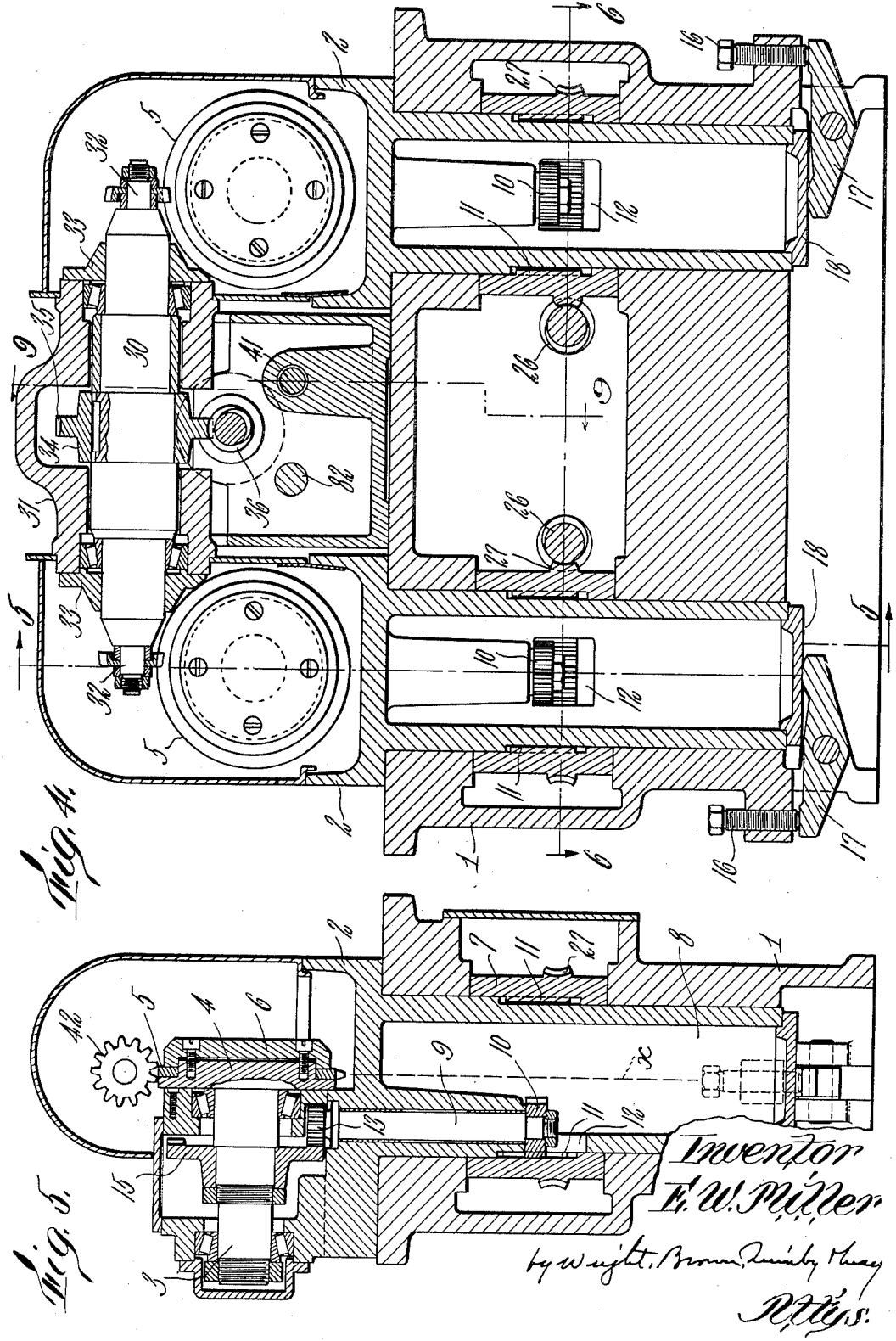

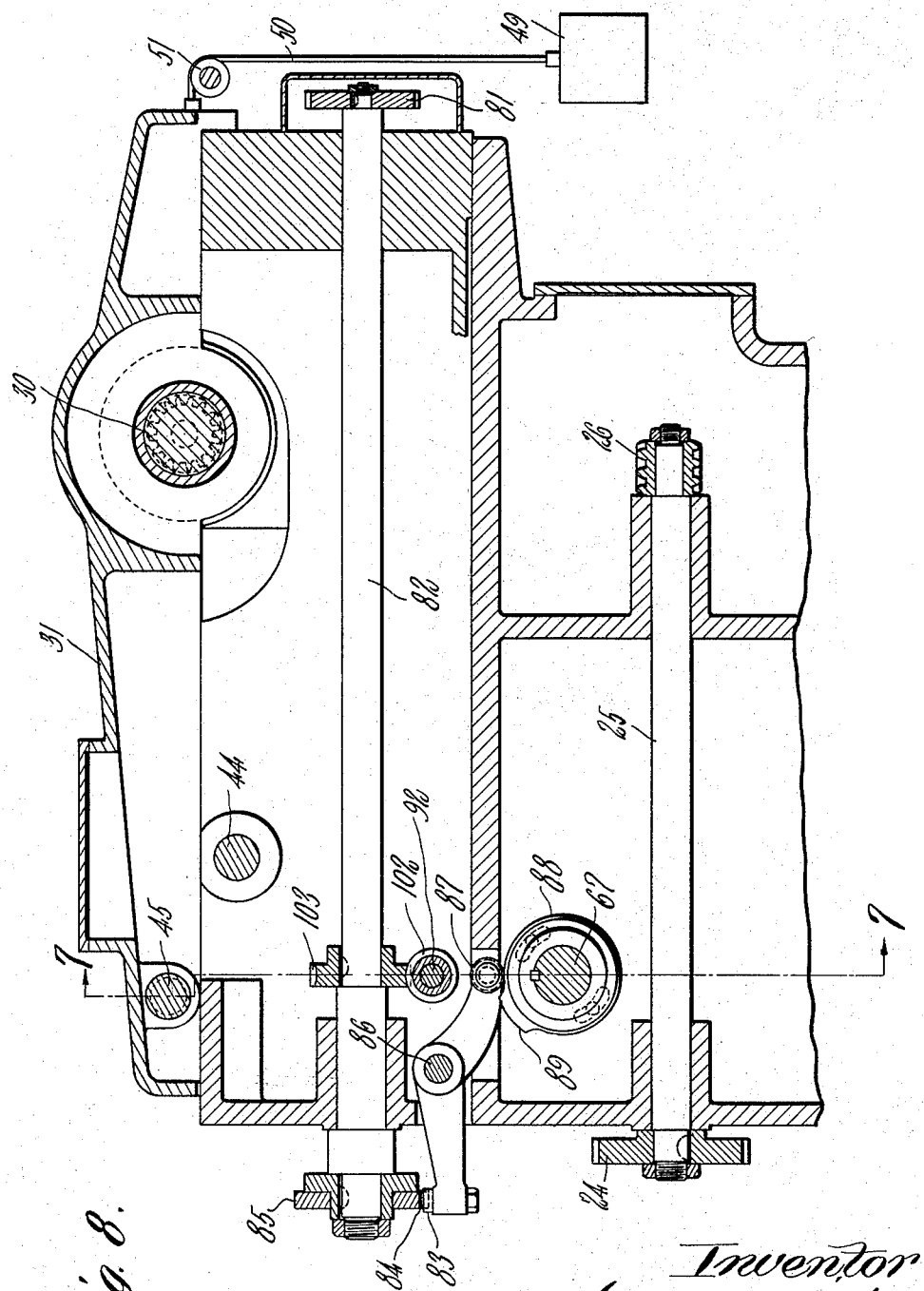

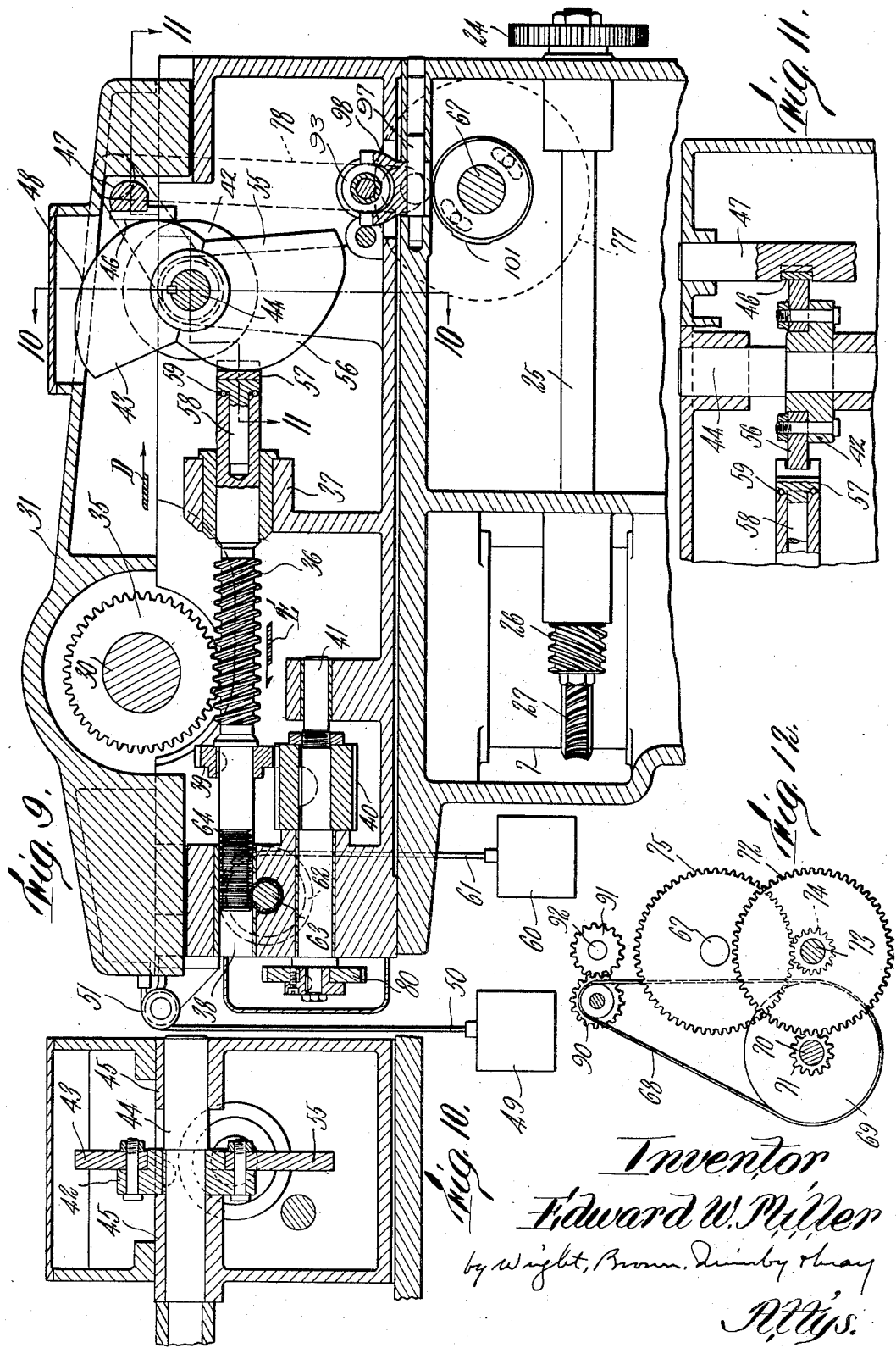

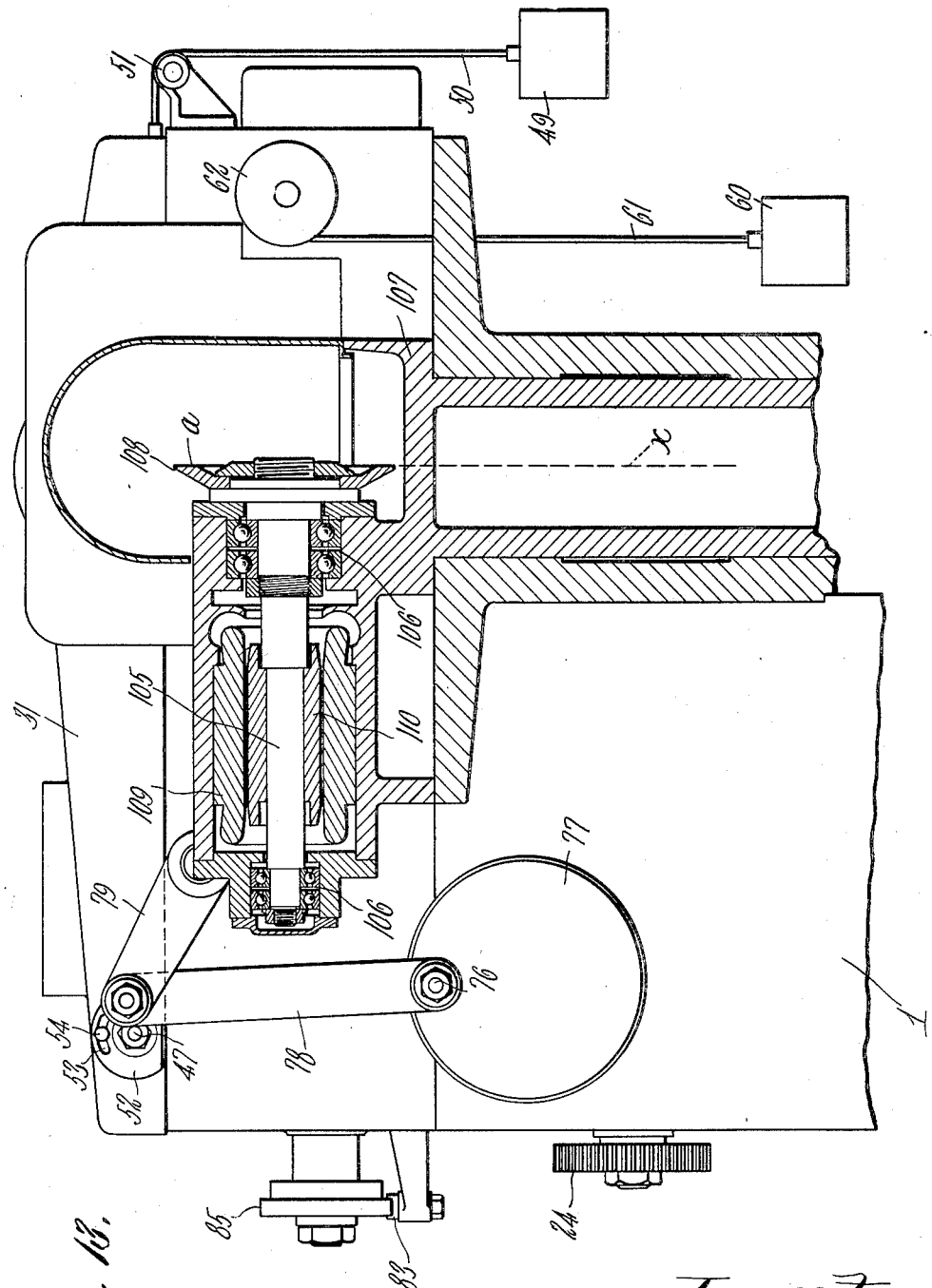

April 10, 1934.  E. W. MILLER  1,953,970
DISPLACEMENT GENERATING MACHINE
Filed June 11, 1930    11 Sheets-Sheet 9
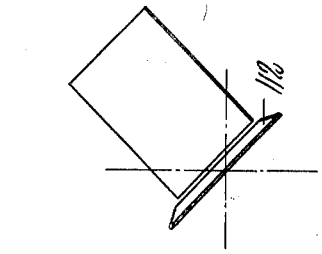
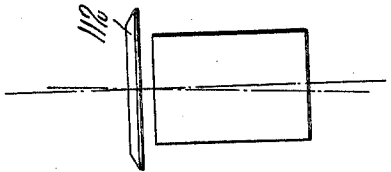
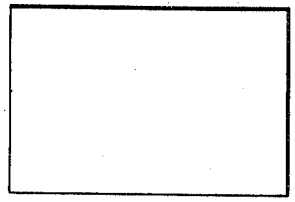
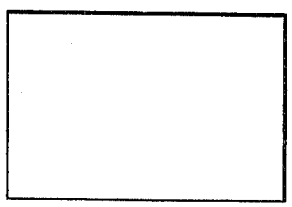
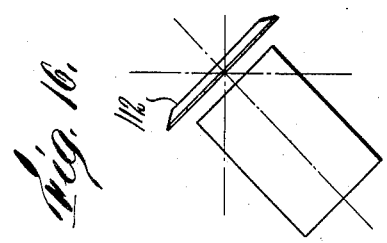
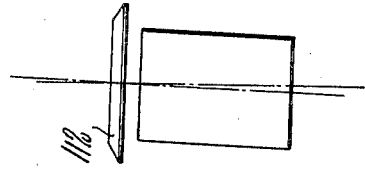
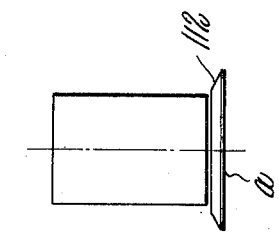
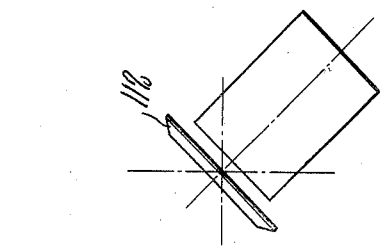
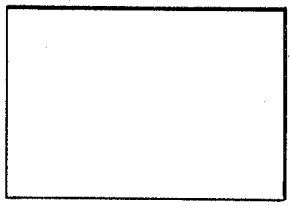
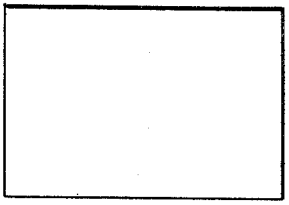
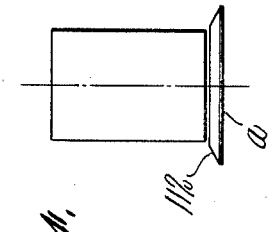
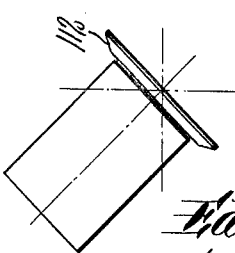
Inventor
Edward W. Miller
by Wright, Brown, Quinby & May
Attys.

April 10, 1934. E. W. MILLER 1,953,970
DISPLACEMENT GENERATING MACHINE
Filed June 11, 1930 11 Sheets-Sheet 10
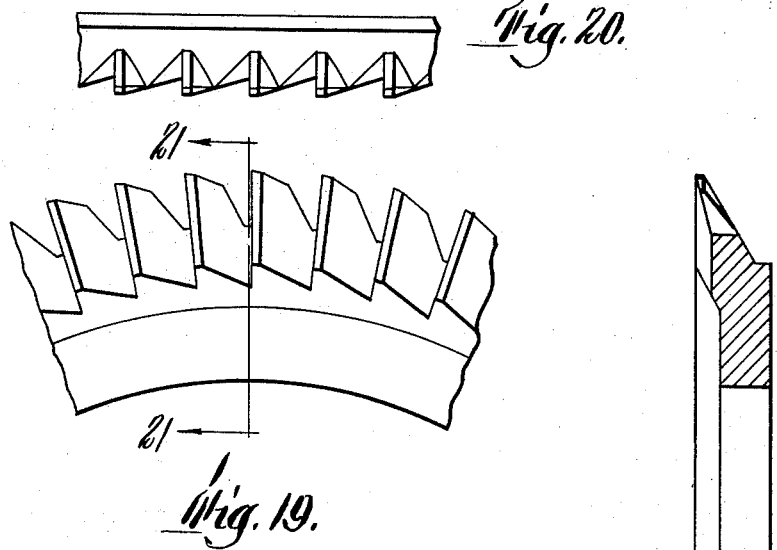
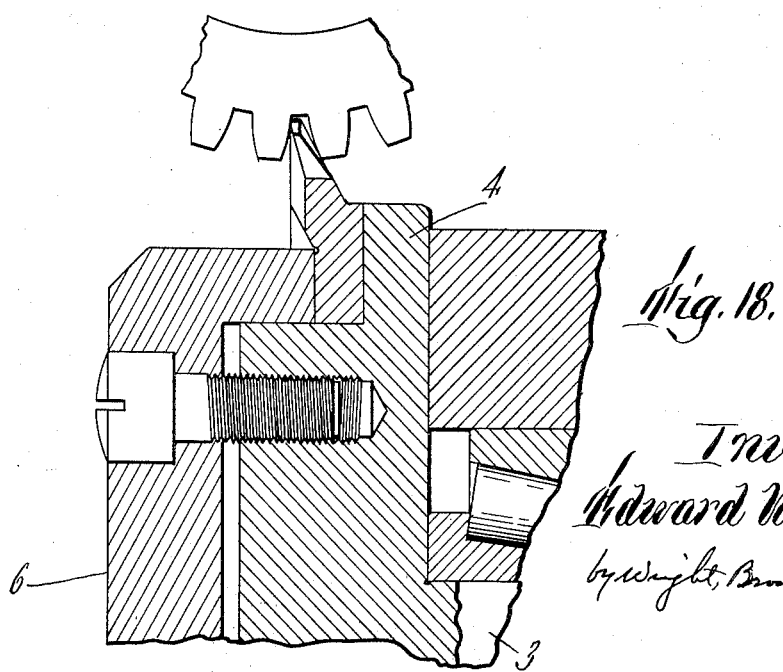

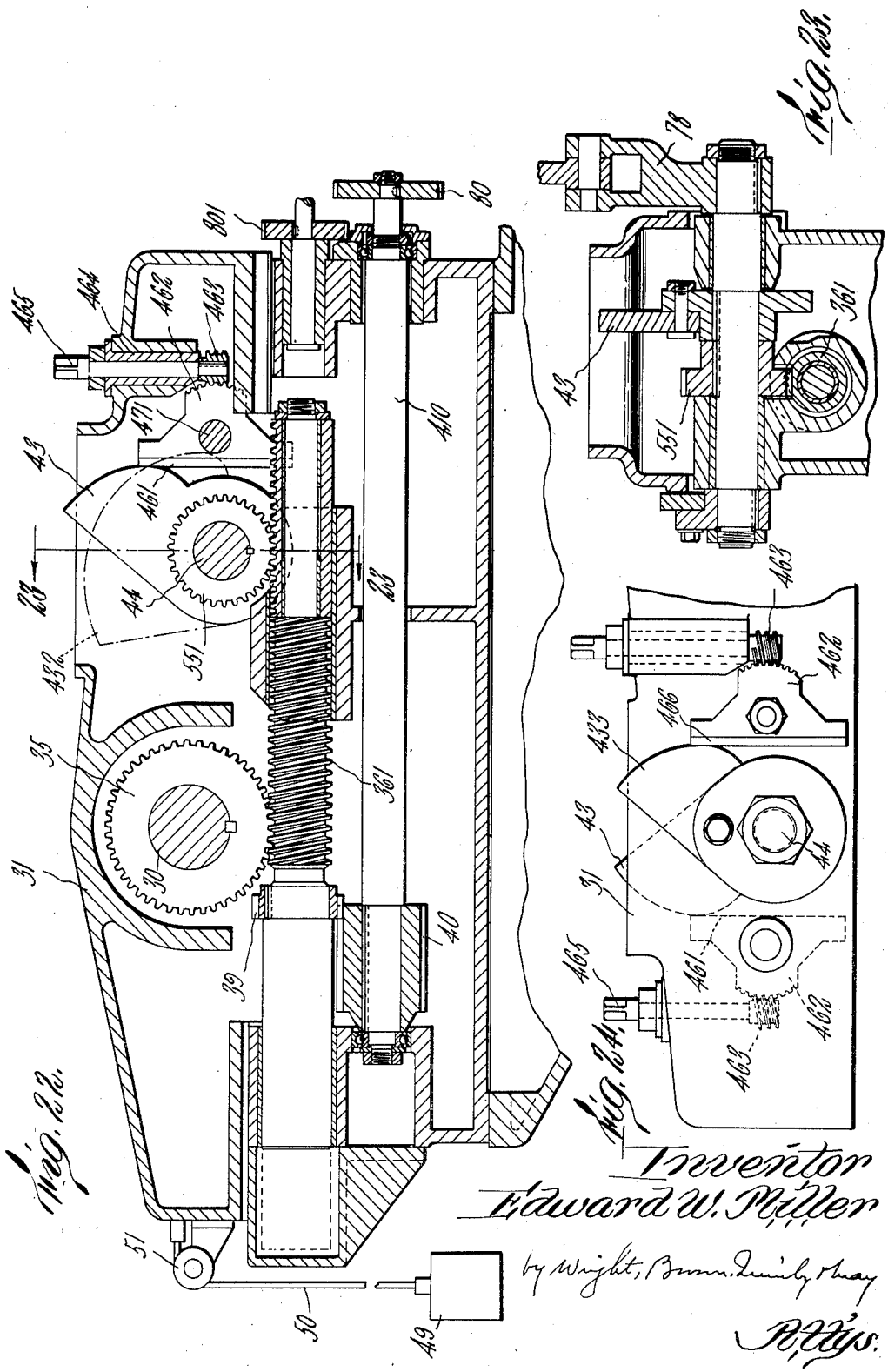

Patented Apr. 10, 1934

1,953,970

UNITED STATES PATENT OFFICE 1,953,970

DISPLACEMENT GENERATING MACHINE

Edward W. Miller, Springfield, Vt., assignor to The Fellows Gear Shaper Company, Springfield, Vt., a corporation of Vermont Application June 11, 1930, Serial No. 460,388

8 Claims. (Cl. 90—4)

This invention relates to machines for generating and cutting the teeth of gear shaper cutters, spur gears, and similar manufactures, either straight or helical. Its primary object is to provide a machine of this nature by which teeth may be cut in the solid blanks, with generation of involute face curves thereon, with great rapidity, by a milling operation. A further object is to provide a machine by which previously roughed out teeth of gears, gear shaper cutters and the like, may be finished, with accurate generation of involute face curves, either by milling or by grinding. In connection with these objects it is a further object to provide a convertible machine which, by the substitution of suitable tools, may be used first for roughing out such teeth from the solid blanks, leaving on their sides, if desired, only the minimum of stock to be removed by a finishing operation, and then finishing the teeth to final form and dimensions in a second operation. Still another object is to furnish means by which the machine may be adjusted with the utmost facility to cut or finish thus either straight spur gears, or helical gears or gear shaper cutters with any desired helix angle of either hand, and to finish and generate the sides of gear shaper cutter teeth, whether straight or helical, with the desired angle of cutting clearance.

To obtain the generating effect referred to combined motions of relative translation and rotation between the work and cutting tool are required, in addition to the cutting rotation of the tool. Heretofore machines have been produced for effecting such movements, in which a rolling head has been employed with a releasable coupling between the rolling head and work spindle to permit indexing. It is a further and subsidiary object of this invention to obviate such rolling head and coupling and provide a solid massive work spindle on which the index wheel is rigidly secured and to which angular generating and indexing movements are given at different times.

In accordance with the invention as herein illustrated, the work spindle is mounted in a carriage, and its rotation is controlled by a worm wheel thereon which engages a rotatable and endwise movable driving worm. The generating movement of the work spindle is accomplished by translative movement of the carriage, effected by a cam or former, and the cooperation of said worm wheel and worm, which latter is moved axially at the same time by another former, or by an equivalent gear. Such means for giving a rolling movement to the work spindle and the work piece thereon constitutes one of the features of the invention for which I claim protection. A further object and feature is the provision of means for separately rotating the same worm so as to index the work.

With the above and other objects in view, as will become more apparent as this description proceeds, my invention consists in the features of construction and operation set forth in the following specification and illustrated in the accompanying drawings. In such drawings I have illustrated certain specific embodiments of my invention, but it will be understood that the invention can be otherwise embodied and that the drawings are not to be construed as defining or limiting the scope of the invention, the claims appended hereto being relied upon for that purpose.

Referring to the figures of the drawings,—

Fig. 1 is a front elevation of my improved machine;

Fig. 2 is a rear elevation thereof;

Fig. 2a is an enlarged elevation of the indexing latch in the unlatched position;

Fig. 3 is a side elevation of the machine;

Fig. 3a is a fragmentary section of a milling cutter having generating edges in a plane perpendicular to its axis;

Fig. 4 is a vertical section through the machine in line with the work spindle, taken on line 4—4 of Fig. 3;

Fig. 5 is a vertical section through the machine in line with one of the tool spindles, taken on line 5—5 of Fig. 4;

Fig. 6 is a horizontal section taken on line 6—6 of Fig. 4;

Fig. 7 is a vertical section taken on line 7—7 of Fig. 8;

Fig. 7a is a detail face view of an adjusting member shown in Fig. 7;

Fig. 8 is a vertical section taken on line 8—8 of Fig. 7;

Fig. 9 is a vertical section taken on line 9—9 of Fig. 1;

Fig. 10 is a vertical section through the formers and former shaft, on line 10—10 of Fig. 9;

Fig. 11 is a horizontal section therethrough taken on line 11—11 of Fig. 9;

Fig. 12 is a vertical sectional view showing certain transmitting mechanism, taken on line 12—12 of Fig. 7;

Fig. 13 is a side elevation of the machine, partially in section, showing how a grinding wheel can be mounted on the machine for grinding the teeth roughed out and finished by the milling operations;

Fig. 14 is a plan view diagrammatically illustrating the tool spindles set at zero position;

Fig. 15 illustrates the same adjustable to a 45 degrees angle, the arrangement being such that the tools are reversed relative to each other;

Fig. 16 illustrates the same relative relationship but with the tools arranged to the opposite hand;

Fig. 17 illustrates the tool spindles adjusted to another position;

Fig. 18 is a detail view illustrating the operative engagement of a milling cutter with a work piece being formed on my machine;

Fig. 19 is a fragmentary face view of the face milling cutter;

Fig. 20 is an edge view thereof;

Fig. 21 is a sectional view through the milling cutter taken on line 21—21 of Fig. 19;

Fig. 22 is a view similar to Fig. 9 showing modifications in certain parts of the machine;

Fig. 23 is a cross section on line 23—23 of Fig. 22;

Fig. 24 is an elevation of one end of the work carriage showing cooperating means for moving the carriage positively in both directions;

The machine here shown to illustrate my invention is a double one, in order to obtain rapidity of production by making two articles at once. It comprises a base 1 within which, on opposite sides of the front portion thereof, are mounted two similar stools 2, each rotatably adjustable about a vertical axis $x$ through slightly more than 180 degrees. Any convenient locking arrangement may be provided for securing the stools in adjusted position. Mounted on each stool in axial intersection with the axis of adjustment $x$ is a tool spindle 3 having a tool holding head 4 so positioned that a tool, as the roughing mill 5 thereon, lies with its diameter in the axis $x$ in all positions of stool adjustment. As illustrated, the mill is secured to the head by a clamping piece 6. This adjustable arrangement of the stools permits roughing out, finish milling or grinding of gear shaper cutters or either straight spur or helical gears at any angle between 0 and 90 degrees of either right or left hand helix, thus making the arrangement universal.

Each spindle 3 is driven by a sleeve 7 mounted on and surrounding the post portion 8 of each stool. A shaft 9 mounted in the stool parallel to the axis has a gear 10 on its lower end in mesh with internal gear teeth 11 on the sleeve, the gear 10 extending through an opening 12 in the post 8. A gear 13 on the upper end of shaft 9 meshes with a crown gear 15 on the spindle. It will be clear that this driving connection is maintained in all positions of stool adjustment. An adjustable means comprising a screw 16, lever 17 and bearing 18 is provided for each stool. By this means the stools can be raised or lowered for different diameters of work.

The sleeves 7 are driven from a motor 19 (Fig. 2), within the base 1, as follows: A silent sprocket chain 20 surrounding a sprocket on the motor shaft engages and drives a sprocket 21 on a shaft 22. A gear 23 on shaft 22 is in mesh with two gears 24 each on a shaft 25. These shafts 25 extend forwardly through the machine and are provided with worms 26 in engagement with worm gear teeth 27 on the sleeves respectively. The tool spindles 3 are thereby driven from the motor 19 in all positions of stool adjustment.

Although the stools are thus adjustable, they remain stationary during the working operations, and the tool spindles 3 then have no movement other than rotation about their own axes. The relative translative movement between the tool and work spindles necessary for generating gear tooth forms is secured herein by moving the work spindle 30. As illustrated, this spindle 30 is mounted in a carriage or slide 31, which is mounted centrally of the machine for forward-rearward movement on the base 1. This spindle is double-ended and is so mounted that when the carriage is in its forward position the work holding ends 32 of the spindle are somewhat forward of the tools on the tool spindles. The slide is of very substantial construction and permits the use of a massive spindle as illustrated; while the spindle is clamped in position under heavy pressure between bearings 33, which carry both the rotary and thrust load in a manner assuring rigidity and preventing chatter. The tool spindles 3, being mounted in like manner, permit heavy cuts to be taken without spindle deflection or weave.

Rotation of the spindle 30 is secured through an index worm wheel 35 having a hub 34 driven and keyed thereon, the teeth of which are engaged by a worm 36. The worm is slidably mounted in bearings 37 and 38 and is withheld from rotation (except when indexing) by a gear 39 thereon in mesh with a relatively long and normally stationary gear 40 on a parallel shaft 41. Both the generating and indexing rotative movements of the spindle 30 are effected through the worm, the first being accomplished by movement of the carriage lengthwise of the worm and axial movement of the latter in the opposite direction, and the indexing movement by independent rotation of the worm, as hereinafter described.

In roughing out a gear or cutter from the solid blank, a milling cutter such as that shown in Figs. 4 and 5 is preferably used. Such cutter is of rack section. That is, its tooth outlines in axial section or profile correspond exactly to those of the parent rack of the gear system to which the work being produced belongs. In case of involute gears and shaping cutters therefor the parent rack has teeth with straight sides, the inclinations of which determine the pressure angle of the gear teeth. The cutter 5 here referred to corresponds to the rack of that system, as plainly appears in Fig. 5. As the work is rolled past the milling cutter, while the latter rotates about its own axis at suitable cutting speed, a notch is cut in the periphery of the solid cylindrical or conical work piece with generation of involute curvature on the adjacent sides of the two teeth bounding the notch so cut.

It may be noted parenthetically here, that the work piece shown in these drawings is a gear shaper cutter which is intentionally made with beveled faces on its outer circumference and on the sides of its teeth, wherefore it is set on the cutter spindle wholly at one side of the plane which includes the cutting tool spindle and is perpendicular to the work spindle as shown with respect to line 5—5 of Fig. 4. But when generating gears of uniform diameter and tooth dimensions from end to end, the work piece is mounted on the spindle with its middle plane (the plane perpendicular to its axis midway between its ends) in the diametral plane of the cutting tool. So far as the object, function and result of this machine is concerned, there is no difference between gears and gear cutters of the shaper type, except for such adjustment of the work as that above alluded to and the further adjustment of the cutting tool angularly about the axis of its stool, later described. Hence, incidental references in this specification to the work as gears is not to be construed as in any sense a limitation of the protection sought.

Generation by means of a milling cutter of rack section produces a slight concavity in the sides of the generated gear teeth due to the fact that the side edges of the cutting teeth travel in conical surfaces of revolution. But when a cutter of large enough diameter is used the concavity may be practically imperceptible; and in any event it is small enough to be corrected by a light finishing cut by an end mill of which the cutting edges are in a plane perpendicular to its axis, or a grinding wheel the active face of which is perpendicular to its axis. Figs. 3a and 18—21 show such an end mill, and Fig. 13 shows such a grinding wheel for thus finishing a roughed out gear. Whether the end mill or end face grinding wheel is used, it is preferably placed with its cutting plane coincident with the axis $x$ as shown in Fig. 13. Such placement enables it to remain in correct position, without further adjustment, when shifted angularly about the axis $x$ for cutting helical teeth.

The same machine may be used for both rough cutting and finish milling or grinding by the substitution of the rack profile mill or the end mill or grinding wheel for one another on the tool spindle 3. Preferably, however, in the interest of rapid production, these operations are performed successively in separate machines, substantially alike except for the different cutting tools and except for means provided in the machine equipped with the grinding wheel for giving the greater rotational speed of the wheel needed for efficient grinding.

The carriage 31 is moved by a machine element 43 in the nature of a cam or wiper, which I call a former, mounted on a shaft 44 in bearings 45 on the machine base. An abutment 46 on a shaft 47 mounted in the carriage has a plane face engaged by the operative periphery 48 of the former. The carriage is urged forwardly by a counterweight 49 on a cord 50 passing over a sheave 51 and connected to the slide in a manner keeping the abutment in contact with the former. A disk 52 keyed to the outer end of shaft 47 has a slot 53 therein through which engages a clamping screw 54. This provides a means for rotatably adjusting the shaft and securing the same in adjusted position. Such rotary adjustment of the shaft permits angular adjustment of the abutment 46, so that its face may be placed at different angles to the radius of the former which passes to the tangent point, thus permitting a very considerable change in pressure angle of the gear tooth face generated by a milling cutter, either of the rack section type or of the face type which corresponds to the emery wheel, and of course also when using a grinding wheel.

In order to properly roll the work piece being formed as the carriage is moved under the action of the former 43 I provide a second former 55. As will be clear hereinafter, such a movement as is provided by the former 55 is necessary when the pitch circle of the index gear 35 is greater or less than the base circle of the work piece. The pitch circle of the index gear is commonly, and as illustrated herein, greater than the base circle of the work piece and in such case the former 55 provides the relative movements illustrated herein. The peripheral portion 56 of this former is engaged by a shoe 57 having a shank 58 rotatably mounted in the end of the worm shaft in a manner providing a thrust bearing 59 therebetween. A counterweight 60 on a cord 61 extends about a sheave 62 fixed in a shaft 63. This shaft has a toothed portion in mesh with encircling rack teeth 64 of the worm shaft and the arrangement is such that the counterweight urges the worm shaft endwise and holds the shoe in contact with the former 55. The engagement of the shaft 63 with the worm shaft at 64 permits free rotation of the worm shaft. It will be obvious that clockwise rotation of the shaft 44 will act through the formers 43 and 55 to move the slide to the right and the worm shaft to the left (Figure 9). This operation will rotate the spindle as the carriage is moved and thereby provide the necessary rolling of the gear or cutter being formed or finished. The extent and control of this movement is dependent entirely upon the movements of the carriage and screw as imparted by the two formers. The peripheral operating portions of these two formers are therefore so designed that they combine to give the spindle the necessary increment of motion to assure the proper generation of the tooth shape desired.

The shaft 44 is oscillated from a motor 66 through the following connections (Figures 6, 7 and 12) a belt 68 from a pulley on the motor shaft to a pulley 69 on a shaft 70, a pinion 71 on shaft 70 in mesh with a gear 72 on a shaft 73, and a pinion 74 on shaft 73 in mesh with a gear 75 on the shaft 67. A crank pin 76 on a disk 77 on this shaft is connected by a link 78 to a crank arm 79 on the shaft 44. The shaft 44 is thereby oscillated as the motor rotates.

In the generating operation above defined, the worm 36 functions substantially as a rack in mesh with the worm wheel 35, since the worm is not rotated during the generating operation. To obtain the correct linear movements of the carriage and worm, the peripheral contours of the formers 43 and 55 are made as involute curves, the base circles of which have a definite relationship which is based on the relationship between the base circle of the cutter or gear to be generated and the pitch circle of the index wheel 35. To explain this relationship, let it be assumed that the base circle circumference of the work piece is 9" and the pitch circle circumference of the index wheel is 25". Assume also that the base circle with respect to which the involute face of the former 43 is developed likewise has a circumferential length of 9". If this involute were developed through 360 degrees and the former rotated a complete revolution in the clockwise direction with respect to Fig. 9, it would move the carriage and work spindle linearly a distance of 9" in the direction of the arrow D. But if the worm 36 were held stationary during this movement, the index wheel would have rolled only 9" along its pitch circumference of 25", and the spindle would have been rotated through only a minor fraction of one revolution instead of through a complete revolution, as would have been necessary in order to give the work piece a true rolling action on its base circumference of 9" with respect to a stationary point. Hence in order to give the necessary additional increment of rotation to the work spindle, the worm should be moved endwise in the direction of arrow E a distance of 16"; wherefore in the assumed example, the involute face of former 55 would be developed from a base circle of 16″ circumference. Actually of course rolling of the work piece along much less than its entire circumference is sufficient for the generation of its teeth in the manner described, wherefore the faces of the formers are developed through much less than 360 degrees; but the same principle holds throughout any fraction of their rotation.

The relationship between the formers applicable to all cases as well as to the foregoing illustration is this:—

Calling A the base circle diameter of former 43;
B the base circle diameter of former 55;
F the base circle diameter of the work piece; and
G the pitch circle diameter of the index wheel;
then $$\frac{A}{B} \text{ equals } \frac{F}{G-F}.$$

Within the scope of this ratio the base circles of the formers may be otherwise than equal respectively to the base circle of the work piece and the pitch circle of the index wheel.

The former 43 is detachable. Indeed both formers are here shown as detachable, being independently fastened to a head 42, as shown in Fig. 10. The head is provided with a flange against which the formers are placed sidewise, and with a hub to the circumference of which their inner circumferences are fitted. They are securely held in place by bolts. It is sufficient for at least a wide range of work if the former 43 only is changed in ratio to work pieces of different dimensions or different pressure angles. But it is not necessary to substitute a different former for every different work piece, because the capacity for angular adjustment of the abutment 46 provides for a considerable range of variation with the use of the same former. This abutment has a plane face which may be set by rotation of the shaft 47 either perpendicular to the direction of movement of the carriage or at various inclinations to such direction. It is in effect a rack tooth with which the former coacts as a gear tooth. By adjusting it with an increasing inclination to the vertical or zero angle position shown in Fig. 9, the nominal pitch line of the rack and gear couple constituted by the abutment and former may be shifted away from the axis of the former, whereby increased movement of the slide is obtained. Thus with the use of a single former 56 and a few formers 43 of graded base circle diameters a wide range of work pieces may be correctly generated.

The former 56 may indeed be replaced by an ordinary gear or gear segment, such as that shown at 551 in Fig. 22, the base circle of which is in the same ratio to that of the former 43 as the base circle of the former 55. Gear 551 meshes with the threads of worm 361, which has the same relation to the index wheel 35 as the worm 36, and is otherwise equivalent thereto. That part of the worm which meshes with the gear 551 is in effect a rack.

The fact that the engagement between gear 551 and the worm threads is positive in both directions makes it unnecessary to use means, such as the weight 60 and gearing 63, 64 shown in Fig. 9, to maintain engagement between these members, wherefore such means are omitted.

A minor modification in the abutment for the former 43 and means for adjustment thereof is also illustrated in Fig. 22. Although the abutment 461 here is identical in principle with the abutment 46 first described, it is different in detail. It is mounted on a pivot shaft 471 and provided with a worm gear segment 462, concentric with the pivot shaft, in mesh with a worm 463 on a shaft which occupies a bearing 464 in the carriage and has a protruding end 465 adapted to receive a wrench by which it may be rotated. The broken lines 432 illustrate a specifically different former which may be substituted for former 43.

In other respects, and except for a minor variation in the driving train for the indexing mechanism, later explained, the machine as shown in Figs. 22 and 23 is substantially identical with the embodiment first described, and its parts are designated by the same reference characters.

Fig. 24, however, shows a means, applicable to the previously described embodiments also, for eliminating the weight 49 by which the work carriage is moved forwardly. This substitute carriage-returning means comprises a cam or former 433 opposite and complemental to the former 43, and a cooperating abutment 466 facing the shaft 44 and at the opposite side thereof from the abutment 461 or 46. This second abutment is also adjustable angularly, and equally or oppositely to the abutment 461, and correspondingly 46.

During the generating operation above described the worm 36 is held from rotation by the gear 39 thereon engaging the relatively long gear 40. At the end of each generating movement of the carriage the work spindle is automatically indexed by means now to be described and which operates through these gears to rotate the worm. A gear 80 (Figs. 1 and 9) on the forward end of shaft 41 is in mesh with a gear 81 on a parallel shaft 82 extending the full length of the machine. During the generating operations this shaft is held from rotation by the engagement of a locking pin 83 (Figs. 2a and 8) in a notch 84 in a disk 85 secured to the end of the shaft 82. The pin is carried on one arm of a bell crank pivoted at 86, the other arm thereof carrying a roll 87 normally resting by gravity on a cam disk 88, on the shaft 67. This cam disk has a raised portion 89 which is adapted to engage the roll and withdraw the pin.

When the pin 83 is withdrawn, the shaft 82 is rotated at high speed by the following means to effect indexing of the spindle 30: A pinion 90 on the motor shaft (Fig. 12) meshes with a gear 91 loose on a shaft 92. The adjacent faces of gear 91 and the cooperating clutch member 93 splined for axial movement on the shaft 92 are formed to cooperate with a friction disk 94 therebetween. A compression spring 95 on the shaft tends to press the member 93 with the disk 94 against the gear 91 in a manner frictionally driving the shaft therefrom. A bell crank 96 pivoted at 97 has a forked arm 98 engaging the hub of member 93 and a second arm 99 carrying a roller 100 rotating on a cam disk 101 mounted on the shaft 67. When the roller is on the high peripheral portion of the disk 101, the member 93 is held from driving contact with the gear 91, and when the roller drops to a lower peripheral portion on the disk, the spring 95 engages the member 93 in a manner frictionally driving the shaft 92. This motion is transmitted to index the spindle by means of a worm 102 on the shaft 92 engaging the worm wheel 103 on the shaft 82.

A minor departure, shown in Fig. 22, from this mechanism, consists in extending the shaft 410 of gear 40 to the rear end of the machine and mounting the gear 80 on that end. The same driving mechanism as above described is here used, which is put in connection with gear 80 through intermediate gearing including a gear 801, and other gears in train and of a character so well understood to the machine designer as to require no illustration or description herein.

In Fig. 13 I have illustrated the manner of adapting my improved machine for grinding the milled cutters or gears. The general construction and arrangement of the machine is the same as above described, except for the tool spindle and its driving means. I herein mount the grinding spindle 105 in bearings 106 on a stool 107 in such position that the grinding face $a$ of the emery wheel 108 may be in the axial line of adjustment $x$ in all positions of stool adjustment. The value of this arrangement will become more apparent by reference to Figs. 14 to 17 of the drawings. The spindle is driven by an electric motor 109, the armature 110 of which is mounted on the spindle shaft, in order to gain the high speed needed for grinding.

The tool spindles are very substantially mounted with the tools thereof in the axial line of stool adjustment $x$ and this relation is maintained in all positions of such adjustment. The function and advantages secured by this arrangement are somewhat illustrated in Figs. 14 to 17. In these figures the tools 112 illustrated may be either face mills or grinding wheels. In Fig. 14 the stools are shown in zero position wherein the faces $a$ of the tools are adapted to operate on spur gear teeth. In Fig. 15 the stools are adjusted to bring the tools into a 45 degree position to operate on a helix angle of 45 degrees. Fig. 16 shows a relationship of similar character but differing in that the arrangement is such as to finish the opposite hand. It will be noted that in both Figs. 15 and 16 the tools are in reverse position relative to each other. In Fig. 17 the stools are adjusted to a position for milling or grinding cutting clearance on the teeth of a gear shaper cutter.

A face mill and its operation in my machine are illustrated in Figs. 18 to 21. This mill engages a tooth of the work piece and operates thereon in a manner very similar to the grinding wheels above described. The actual engagement of the mill with a tooth of the work is illustrated in Fig. 18. As the carriage is moved and the spindle 30 is rotated under the action of formers 43 and 55, the work piece is made to roll past the tool in a manner generating and finishing the cutter tooth to a predetermined curvature.

It is believed that the operation of the machine will be understood from the above description taken in connection with the accompanying drawings. The teeth are first roughed out in the blank by the use of the roughing mill 5. This operation provides a rapid method of roughing out the tooth spaces by a generating motion which leaves the minimum amount of stock to be thereafter removed in the finishing operation and eliminates the fillet which is left at the base of the teeth in the usual roughing out operations as heretofore commonly performed. Although the rolling of the blank or cutter about the mill 5 in this roughing operation results in a slight concavity of the teeth of the work piece because the cutting edges of the mill are elements of a cone such error is of no particular concern, since the subsequent finish milling or/and grinding operations correct the same and assure the proper tooth shape. The generating operation takes place, as will be understood, as the carriage and worm are moved in opposite directions under the action of the formers 43 and 55 as driven from shaft 67 through the link connection 78. At the end of each such operation, and while the crank end 76 is substantially at "dead centre", the spindle 30 is automatically indexed the distance of one tooth. The cam disks 88 and 101 are so adjusted on their shaft 67 that they function to withdraw the pin 83 and permit the spring 95 to engage the indexing friction clutch at 94. The indexing shaft 82 is thereupon rotated until the detent again snaps into its notch 84. The angle of indexing, for making cutters or gears differing in number of teeth, can be varied by varying the change gears 80 and 81.

I claim:

1. In a machine of the character described, a tool holder, a slide, a work-holding spindle on the slide, a worm gear on the spindle, a worm engaging the gear, means for effecting relative movement between the slide and worm lengthwise of the worm and without rotation of the worm so as to move bodily and rotate the spindle in a manner generating a predetermined tooth curvature on the work on the spindle by a tool on the tool holder, spindle indexing means geared to the worm and including a clutch, locking means for preventing rotation of the worm, and means for automatically disengaging the locking means and engaging the clutch for indexing the spindle.

2. In a machine of the character described, a tool holder, a slide, a work-holding spindle on the slide, a worm gear on the spindle of larger diameter than the gear to be cut, a worm engaging the gear, a former for moving the slide in one direction, a second former for moving the worm endwise in the opposite direction, at such speeds as to move bodily and rotate the spindle in a manner generating a predetermined tooth curvature on the work on the spindle by a tool on the tool holder, a rotary thrust bearing and an engaging shoe between the worm and its former, spindle indexing means connected to and adapted to rotate the worm, and means normally holding the shoe against the former in a manner permitting rotation of the worm.

3. In a machine of the character described, a tool holder, a slide, a work-holding spindle on the slide, a gear on the spindle, a rack member engaging the gear, two rotary cams for respectively moving the slide and member bodily in relatively opposite directions at such speeds as to move bodily and rotate the spindle in a manner generating a predetermined tooth curvature on the work on the spindle by a tool on the tool holder, an abutment member on the slide having a face adapted to be engaged by the slide actuating cam to effect the movement of the cam, and means for adjusting the abutment member to vary the inclination of its engaging face with the radius of the cam which passes to the point of tangency.

4. In a machine of the character described, a base, two stools respectively mounted for rotary adjustment therein about separated parallel axes a tool spindle mounted on each of the stools transversely to the axis of its respective stool and having a tool so positoned that its working part is in said axis in all positions of stool adjustment, means for rotating the spindles in all said positions of adjustment, a slide on the base between the stools, a work spindle in the slide having its opposite ends arranged to carry work pieces in operative relation to the respective tools, and means for moving the slide and work spindle bodily and rotating the spindle in a manner generating a predetermined tooth curvature on the work on the work spindle by said tools.

5. In a gear generating machine, the combination with a reciprocatable work carriage and a rotatable work spindle mounted in said carriage with its axis transverse to the directions of movement of the carriage, of means for rotating and indexing said work spindle comprising a worm extending in the direction of movement of the carriage, a gear wheel mounted on said spindle in mesh with said worm and adapted to roll along the worm when the carriage is reciprocated, a driving train geared to said worm for rotating it, a lock normally in obstructing relation with said train to prevent rotation of the worm, and timing means for releasing said lock and setting said train in action at a predetermined time in the cycle of the machine.

6. In a gear generating machine as set forth in claim 5, a normally disconnected clutch in the driving train, and means for connecting said clutch when the lock is released.

7. In a gear generating machine as set forth in claim 5, the driving train comprising a normally disconnected clutch between the source of power and a driven element of the train, a lock normally engaging one of the members of the train and preventing its motion, and two cams driven from the source of power operatively arranged, and timed, one of them to release the lock and the other to cause coupling of said normally disconnected clutch.

8. In a machine of the character described, a tool holder, a slide, a work holding spindle on said slide, a worm gear on the spindle, of larger diameter than the gear to be cut, a worm engaging the worm gear, means for moving the slide and worm bodily and simultaneously in opposite directions at such respective speeds as to impart generative rolling movement to the work on the spindle relative to a tool on the tool holder, spindle indexing means including a relatively long and normally stationary gear, a gear in sliding mesh therewith connected to and movable bodily with the worm, intermittent driving means for said long gear, and means for putting said driving means into and out of action.

EDWARD W. MILLER.